United States Patent
Phool

(10) Patent No.: US 7,702,365 B2
(45) Date of Patent: Apr. 20, 2010

(54) MULTIPLE ACCESS WIRELESS COMMUNICATION SYSTEM USING TRANSMITTER-RECEIVERS SUPPORTED BY REMOTE SOFTWARE-CONFIGURED SIGNAL PROCESSING DEVICES

(76) Inventor: Tejbir Phool, 11530 Swains Lock Ter., Potomac, MD (US) 20854

( * ) Notice: Subject to any disclaimer, the term of this patent is extended or adjusted under 35 U.S.C. 154(b) by 839 days.

(21) Appl. No.: 11/474,441

(22) Filed: Jun. 26, 2006

(65) Prior Publication Data

US 2008/0300005 A1 Dec. 4, 2008

Related U.S. Application Data

(60) Provisional application No. 60/693,425, filed on Jun. 24, 2005.

(51) Int. Cl.
*H04M 1/00* (2006.01)
*H04B 1/38* (2006.01)
(52) U.S. Cl. .................... 455/561; 455/560; 455/562.1; 455/41.2
(58) Field of Classification Search ....... 455/3.01–3.06, 455/560–561, 41.1–41.2, 562.1
See application file for complete search history.

(56) References Cited

U.S. PATENT DOCUMENTS

| | | | |
|---|---|---|---|
| 4,901,307 A | 2/1990 | Gilhousen et al. | |
| 5,627,879 A | 5/1997 | Russell et al. | |
| 6,138,022 A * | 10/2000 | Strawczynski et al. | 455/445 |
| 6,308,063 B1 * | 10/2001 | Koistinen et al. | 455/422.1 |
| 6,381,472 B1 * | 4/2002 | LaMedica et al. | 455/560 |
| 6,584,146 B2 | 6/2003 | Bose et al. | |
| 6,622,019 B1 * | 9/2003 | Shalem et al. | 455/445 |
| 6,654,428 B1 | 11/2003 | Bose et al. | |

(Continued)

FOREIGN PATENT DOCUMENTS

WO WO-2005/125111 A2 12/2005

OTHER PUBLICATIONS

Dimitrios Efstahiou, Basestation Transceiver Trends for 3G and Beyond Wireless Systems, Personal, Indoor and Mobile Radio Communications, 2001 12th IEEE International Symposium, Sep. 2001, pp. 117-121.

*Primary Examiner*—Tuan A Tran
(74) *Attorney, Agent, or Firm*—Blank Rome LLP

(57) ABSTRACT

The invention relates to a method and system for multiple access wireless communication system using transmitter-receivers supported by remote, software-configured, signal processing devices. An illustrative embodiment of the downlink transmission system includes a method and for receiving signals from the internet, PSTN, or other networks and assigning the signal to one of several shared, software configured, signal processing devices that processes these signals, digitizes them, and compresses them before forwarding them to a thin client transmitter. This thin client transmitter system decompresses the received signals, and transmits it to remote users using the appropriate wireless protocol. The embodiment also comprises an uplink transmission system that includes: an antenna for receiving analog RF signals transmitted by remote users; an analog to digital convertor that converts these analog signals into digital signals; a method for compressing the digital signals; and a method and for transporting the compressed digital signals to a remotely located, software configured, shared signal processing system. The shared remote signal processing system decompresses these signals; assigns the decompressed signal to one of several shared, software configurable signal processing devices that processes these signals and transmits the signals onwards via the internet, switched telephone, or other networks.

18 Claims, 6 Drawing Sheets

System Diagram

U.S. PATENT DOCUMENTS

| | | |
|---|---|---|
| 6,701,139 B1 * | 3/2004 | Kushmaro et al. ........... 455/131 |
| 6,775,270 B1 * | 8/2004 | Rhodes et al. ............... 370/352 |
| 7,457,315 B1 * | 11/2008 | Smith .......................... 370/473 |
| 7,554,960 B2 | 6/2009 | Steinheider et al. |
| 7,583,735 B2 | 9/2009 | Bauman et al. |
| 2002/0055371 A1 | 5/2002 | Arnon et al. |
| 2006/0221913 A1 | 10/2006 | Hermel et al. |
| 2006/0222019 A1 | 10/2006 | Hedin et al. |
| 2006/0222054 A1 | 10/2006 | Conyers et al. |
| 2006/0223514 A1 | 10/2006 | Weaver et al. |
| 2006/0223515 A1 | 10/2006 | Hermel et al. |

* cited by examiner

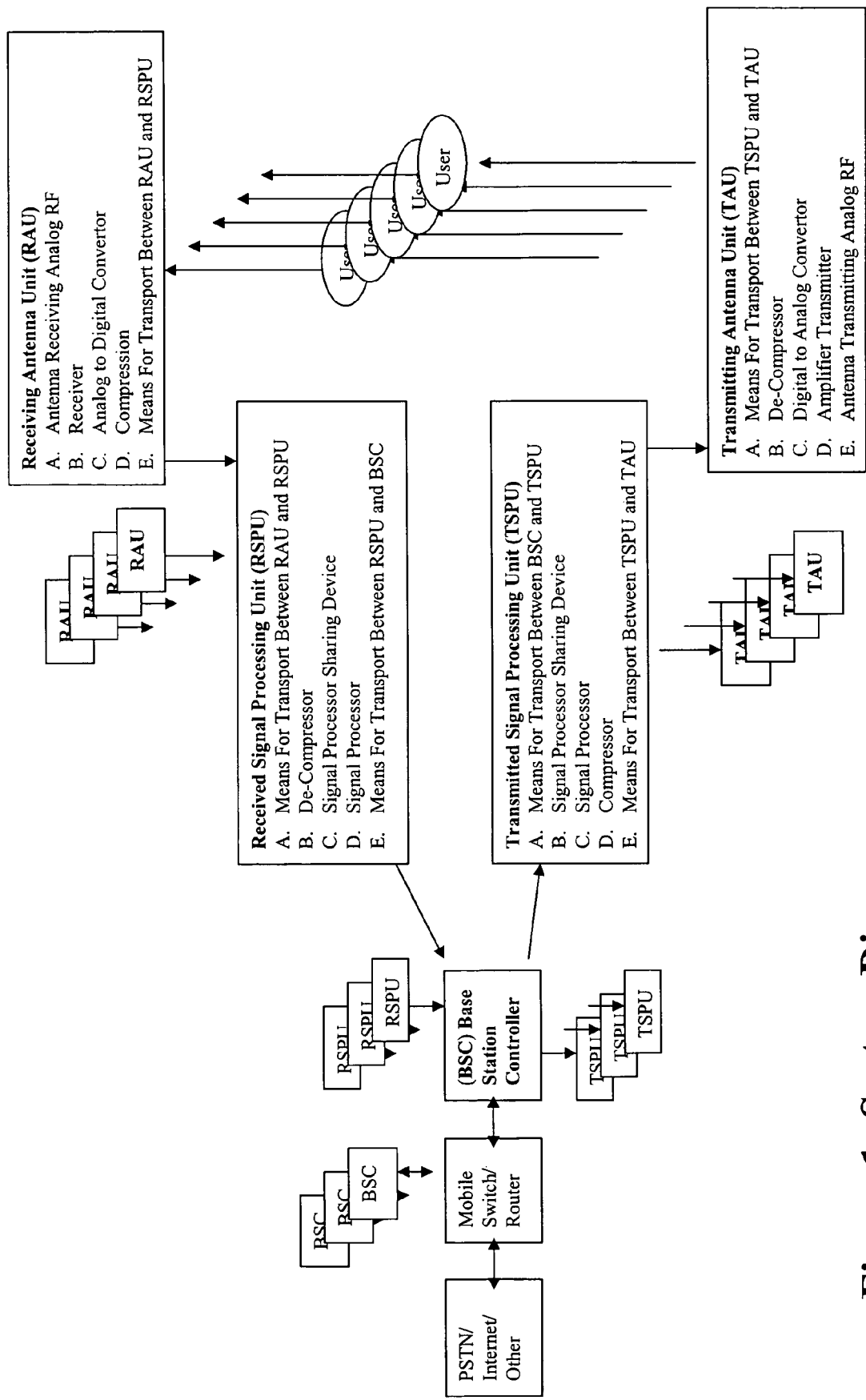
Figure 1: System Diagram

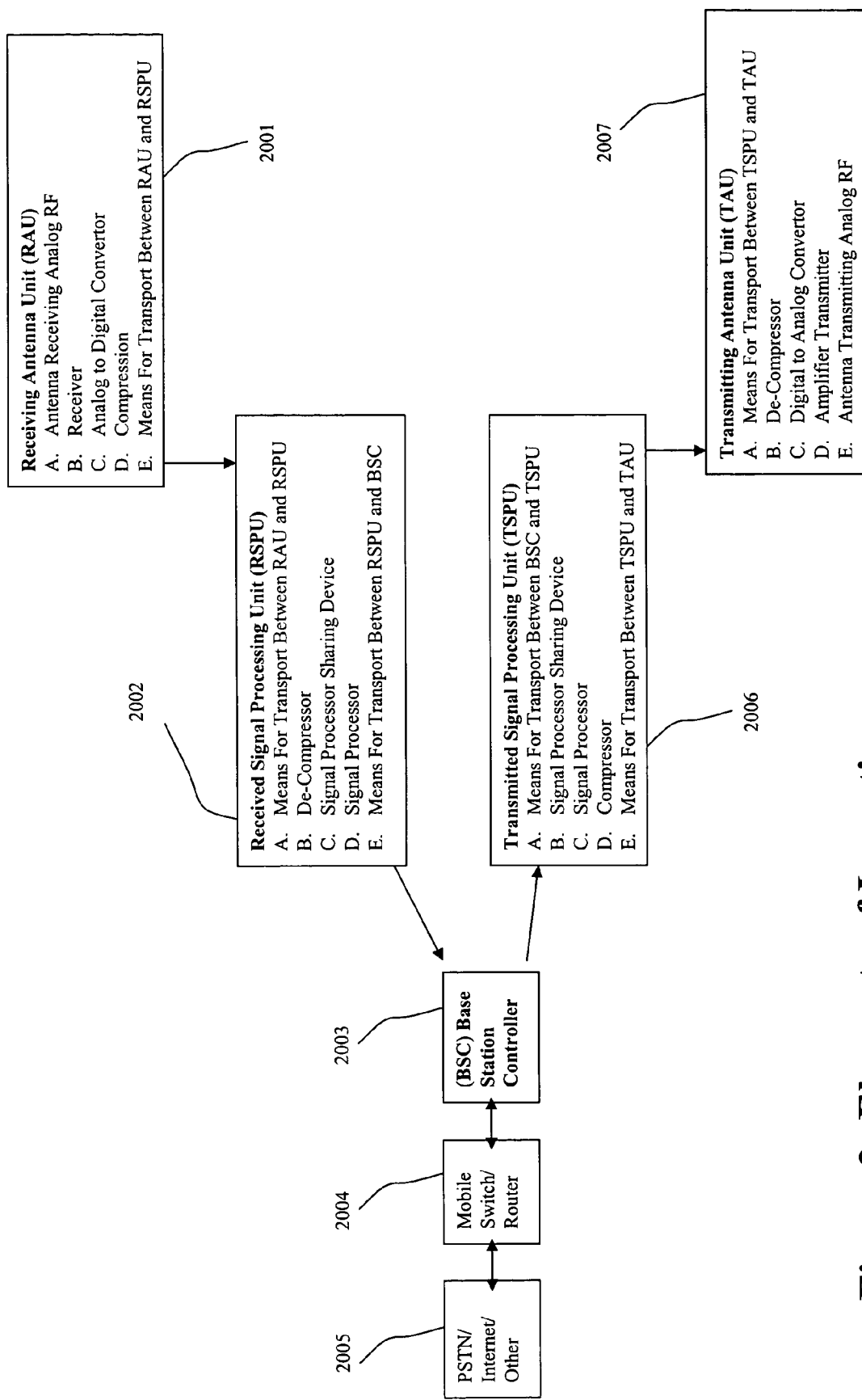
Figure 2: Elements of Invention

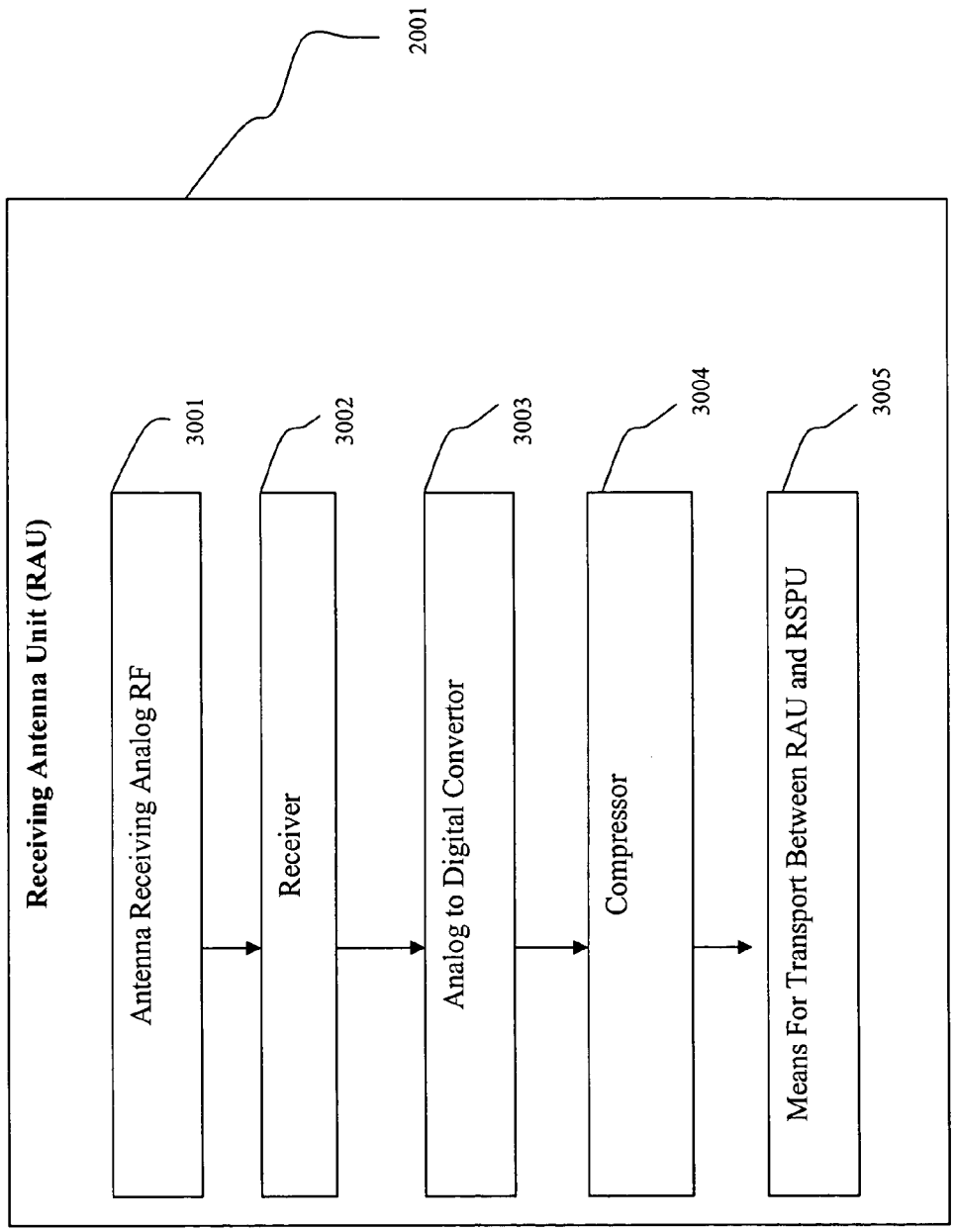
Figure 3: Example Embodiment of RAU

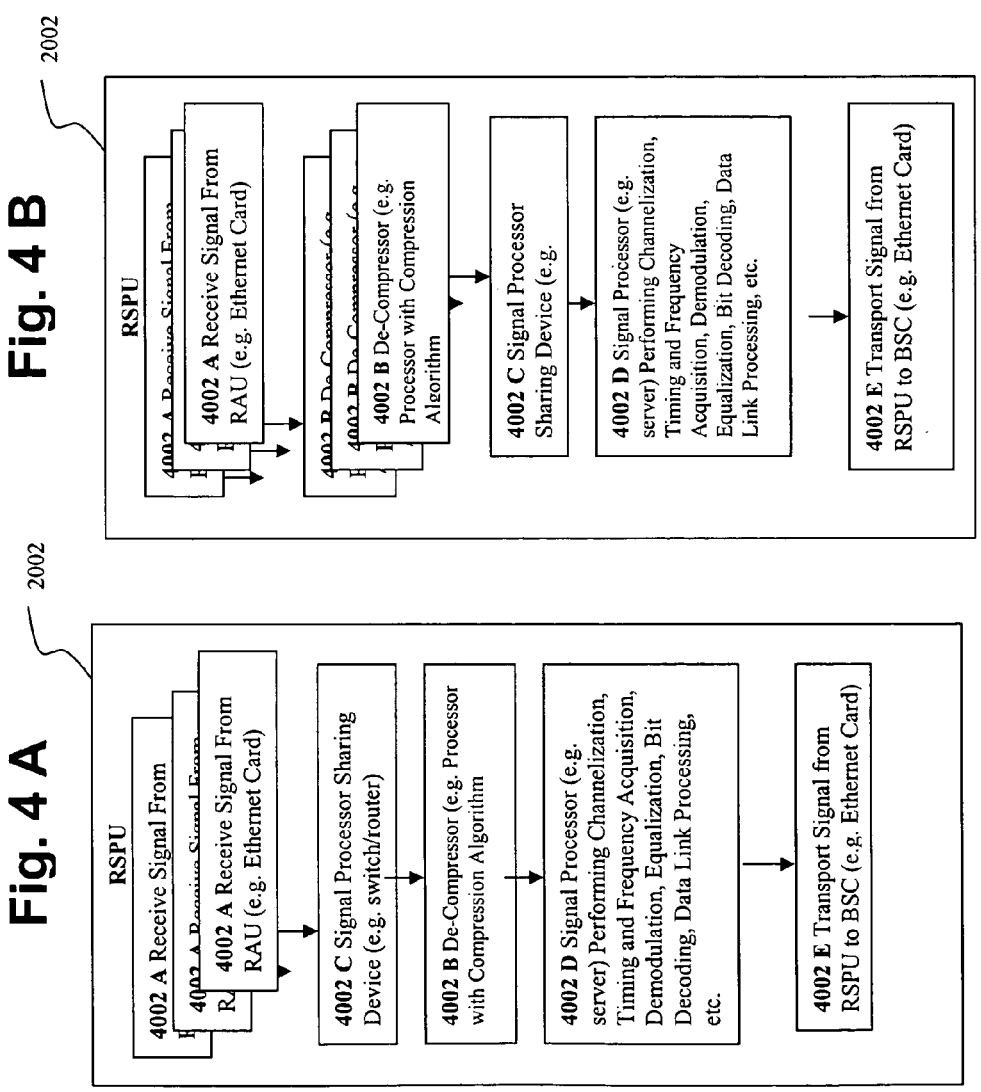
Figure 4: Example Embodiments of the RSPU

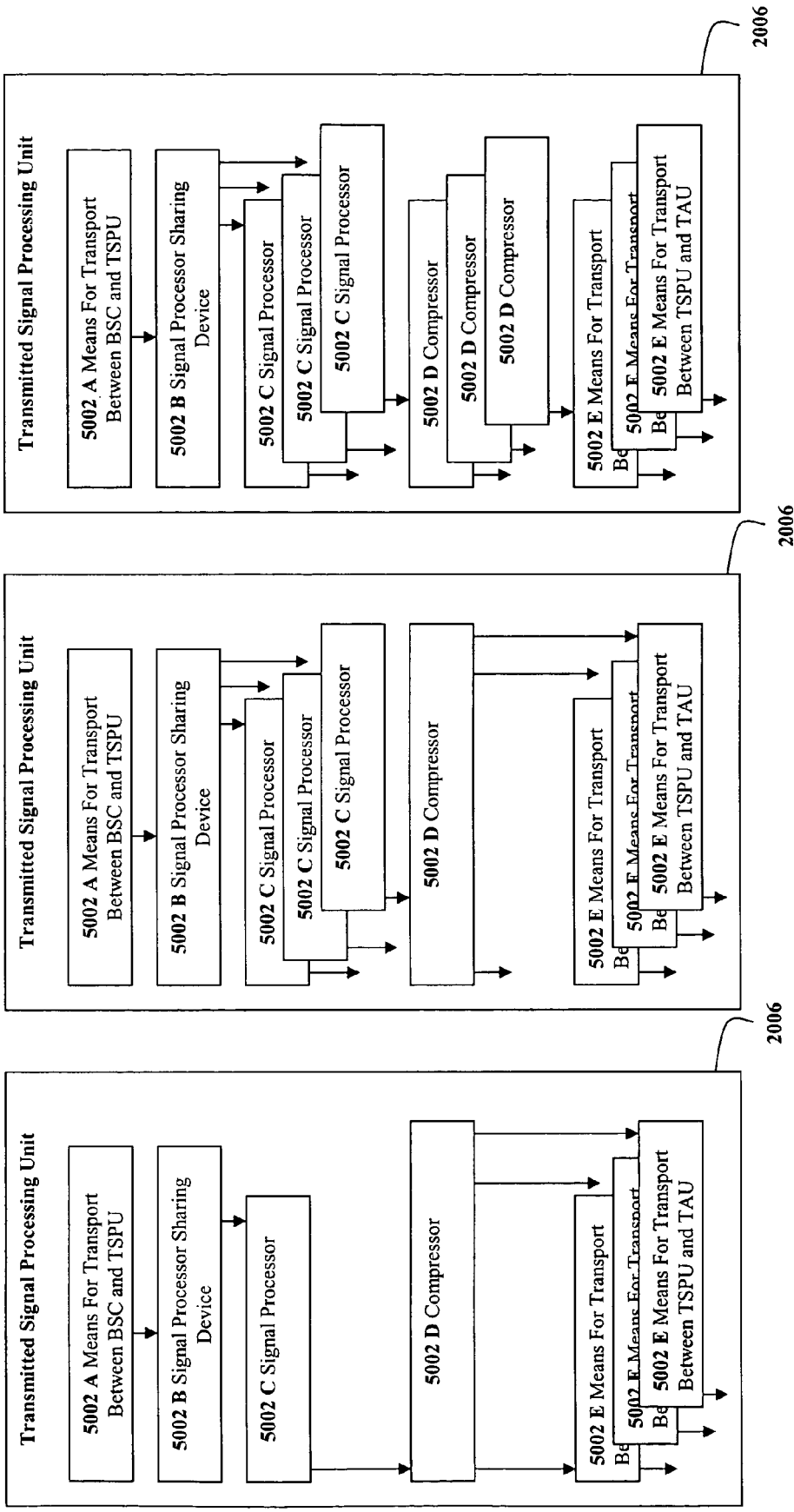
Figure 5: Example Embodiments of the TSPU

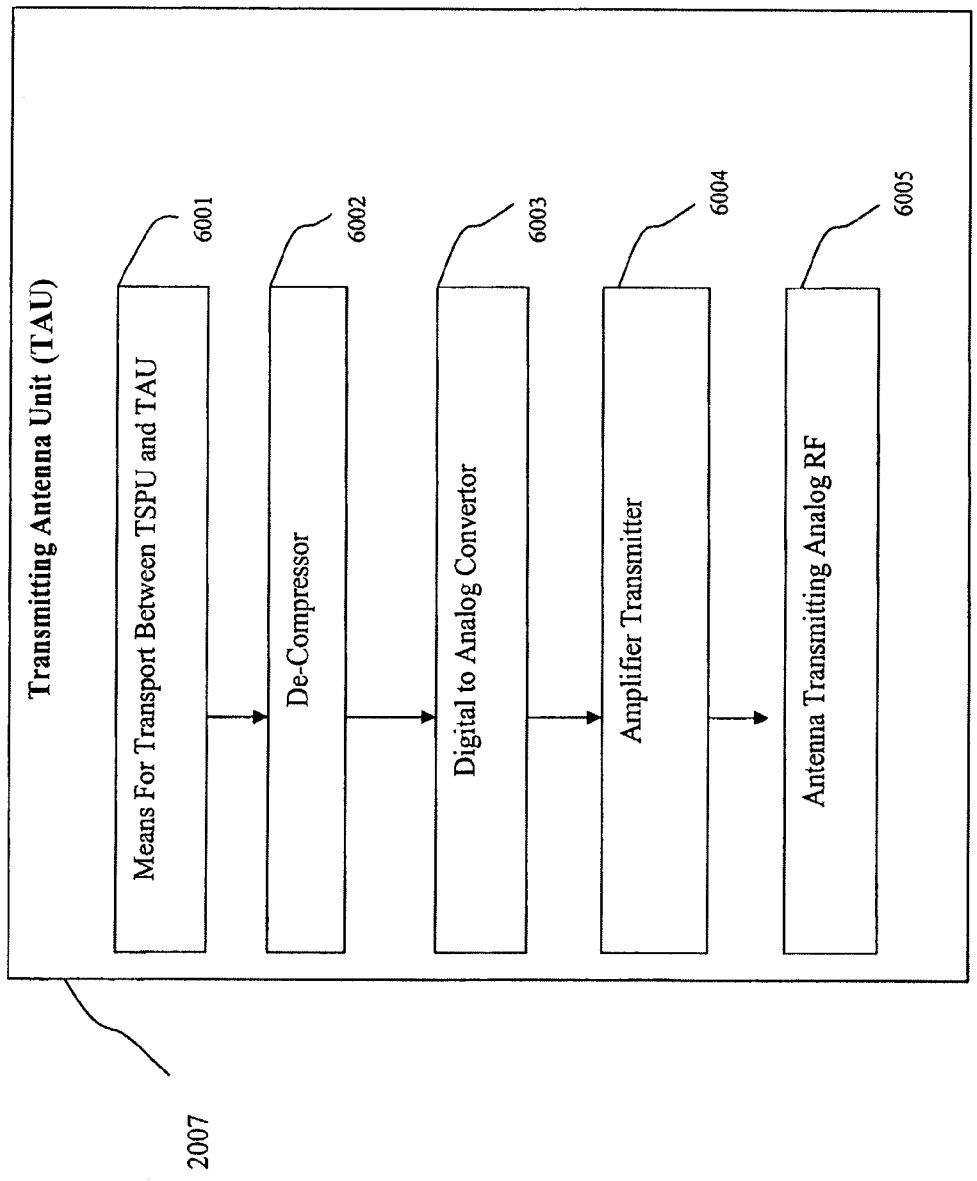
Figure 6: Example Embodiment of TAU

MULTIPLE ACCESS WIRELESS COMMUNICATION SYSTEM USING TRANSMITTER-RECEIVERS SUPPORTED BY REMOTE SOFTWARE-CONFIGURED SIGNAL PROCESSING DEVICES

RELATED APPLICATIONS

This application claims priority of provisional application 60/693,425, filed Jun. 24, 2005, which is hereby incorporated by reference.

FIELD OF THE INVENTION

This invention relates generally to wireless communications. More particularly, the invention relates to a method and system for multiple access wireless communication system using system transmitter-receivers supported by remote software configured signal processing devices.

DESCRIPTION OF THE BACKGROUND OF THE INVENTION

Traditional cellular networks in use today rely on a thick-client approach for network edge signal processing for voice calls as well as for data calls. More particularly, for calls originating at land-lines, a Public Switched Telephone Network (PSTN) local office typically converts an optical signal to base band frequency (BBF) for delivery to the Mobile Switching Center (MSC). The MSC switches the signal to a Base Station Controller (BSC) that conveys it to one of several Base Stations (BTS) with radio frequency (RF) management instructions. The BTS then uses an antenna to down link this signal to the user. Calls originating from users are up linked to the antenna adjacent to a BTS. The BTS conveys the call upstream via the BSC and MSC into the PSTN.

When a call is processed from a downlink perspective, the BTS typically performs many functions. For instance, the BTS may interface with the landline voice circuits from the BSC. The BTS may also combine several voice circuits into an RF channel. More specifically, several base band circuits are combined and converted into the desired radio frequencies. As another example, the BTS may also amplify and transmit the RF channel to the remote users.

When the call is processed from an uplink perspective, the BTS may be configured to receive the RF channel that includes the signals of multiple remote users. The BTS may also separate voice circuits from the received RF channel. More specifically, the RF signal is signal processed through low-noise amplifiers, RF filters, and digital and/or analog baseband processing. Finally, the BTS may be configured to transport voice circuits to the BSC through analog modems. Since significant call processing is conducted at the edge of the network this approach may be called the thick client paradigm. An example of the thick client paradigm may be found in U.S. Pat. No. 4,901,307, which is hereby incorporated in its entirety by reference.

Although the thick client paradigm is a workable solution, it is not without its drawbacks and disadvantages. For example, during downlink and uplink processing, the BTS generally requires a large amount of processing capacity, which is typically supplied by relatively expensive digital signal processors (DSPs) and application specific integrated circuits. The DSPs are often application specific and produced in limited quantity. Moreover, these DSPs do not generally allow for cross applications such as WiMax, GSM, CDMA or other protocols. As a result, carriers are required to maintain expensive independent and parallel equipment and networks to support these other protocols.

Another approach in cellular call processing is the thin-client paradigm. An example of this thin-client paradigm is described in U.S. Pat. No. 5,627,879, ("the '879 patent") which is hereby incorporated in its entirety by reference. In the thin client paradigm, the BTS is separated into two parts: an antenna unit (AU) and a base station unit (BSU). This thin client approach offers an advantage that, the AU is wireless protocol agnostic (WiMax, CDMA, GSM, etc.). However, a problem with this approach is that digitization of the RF signal increases the bandwidth requirements for the link between the AU and the BSU, and traditionally used T–1's, T–3s, or microwave links are often inadequate, requiring the use of optical fiber which is still not ubiquitously available.

In one embodiment described in the '879 patent, decimation filters are provided for filtering out unwanted channels from the digital stream so that the signals from the antenna units can be moved to and from base station units over lower speed carriers such as T–1 lines. While this embodiment solves a backhaul bandwidth problem it reintroduces two other problems. First, additional digital signal processing required at the AU ensures that it does not remain a thin client. Second, the AU is again protocol constrained as in the thick client approach.

SUMMARY OF THE INVENTION

An illustrative embodiment of the uplink or receiving system includes an antenna for receiving analog RF signals transmitted by remote users and an analog to digital conversion means for converting these analog signals into digital signals. The embodiment also includes a means for compressing the digital signals and a means for transporting the compressed digital signals to a shared, software configurable, remotely located signal processing system. The shared remote signal processing system includes a means for receiving the compressed digital signals and a means for decompressing these signals. The shared remote signal processing system also includes a means for assigning the decompressed signal to one of several shared, software configurable, signal processing devices and a means for processing these signals. The shared remote signal processing system further includes a means for transmitting the processed signals onwards via the internet, switched telephone, or other networks.

An illustrative embodiment of the downlink or transmission system includes a means for receiving signals from the internet, switched telephone and/or other networks and a means for assigning the signal to one of several shared, software configurable, signal processing devices. The embodiment also includes a means for processing these signals and a means for packaging the processed signals destined for different users into frames of the appropriate wireless protocol. The embodiment further includes a means for compressing these digital signals and a means for transporting the compressed digital signals to the appropriate transmitting antenna unit. The transmitting antenna unit system includes a means for receiving compressed digital signals from the transmitting signal processing unit and a means for decompressing these signals. The transmitting antenna unit system also includes a digital to analog converter for converting these digital signals into analog signals and an amplifier-transmitter for transmitting analog RF signals over the antenna to remote users.

BRIEF DESCRIPTION OF THE DRAWINGS

Various features of the embodiments can be more fully appreciated and at the same become better understood with reference to the following detailed description of the embodiments when considered in connection with the accompanying figures, in which:

FIG. 1: System Diagram, illustrates an exemplary block diagram of a system in accordance with an embodiment of the invention;

FIG. 2: Elements of Invention, highlights key elements of the invention.

FIG. 3: Example Embodiment of RAU, depicts the arrangement of processing elements within the RAU.

FIG. 4: Example Embodiments of the RSPU depicts examples of the arrangement of processing elements within the RSPU.

FIG. 5: Example Embodiments of the TSPU depicts examples of the arrangement of processing elements within the TSPU.

FIG. 6: Example Embodiment of TAU depicts the arrangement of processing elements within the TAU.

DETAILED DESCRIPTION OF THE PREFERRED EMBODIMENTS OF THE INVENTION

For simplicity and illustrative purposes, the principles of the present invention are described by referring mainly to exemplary embodiments thereof. However, one of ordinary skill in the art would readily recognize that the same principles are equally applicable to, and can be implemented in, all types of wireless communication systems, Radio Frequency Identification System, etc., and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

The present invention details a cellular communications system that, through an enhanced design, reduces backhaul transmission bandwidth requirements and signal processing equipment requirements and thereby allows for a reduction in network operating costs. Elements of the invention include the following components (FIG. 2): a Receiving Antenna Unit (RAU) 2001, a Received Signal Processing Unit (RSPU) 2002, a Base Station Controller (BSC) 2003, a Mobile (Switch/Router) 2004, a Transmitted Signal Processing Unit (TSPU) 2006, and a Transmitting Antenna Unit (TAU) 2007.

The System Diagram (see FIG. 1) illustrates an exemplary block diagram of a system in accordance with a preferred embodiment of the invention. Devices that communicate with the network are generally referred to here as "Users" and may include active users such as voice cell phone users, data communication devices such as modems, as well as passive users such as Radio Frequency Identification Devices that are typically embedded in items of inventory. In instances where a call or signal directed at the user originates in a network such as the PSTN/Internet 2005 or other device (FIG. 2), it is transmitted to a switch/router 2004 and on to a Base Station Controller (BSC) 2003.

A plurality of Base Station Controllers preferably communicates with the switch/router. The switch/router selects the appropriate BSC based on availability, technical suitability, and other criteria. The Base Station Controller 2003 forwards the signal to one of a plurality of Transmitted Signal Processing Units (TSPU) 2006 with which it communicates via wires or wirelessly, selecting such TSPU based on that TSPU's ability to communicate with a desired user via a communicating TAU. Each TSPU 2006 further communicates via wires or wirelessly with a plurality of remotely-located Transmitting Antenna Units (TAU) and forwards the signal to the appropriate TAU 2007 that is capable of communicating with the appropriate user. Each TAU 2007 communicates wirelessly with a plurality of Users and forwards the signal to the appropriate user.

Autonomous signals or return signals from Users are transmitted to one or more Receiving Antenna Units (RAU) 2001 which then convey the signal to a Received Signal Processing Units (RSPU) 2002 to which they are capable of communicating. Each RSPU 2002 communicates with a plurality of RAUs. The RSPU 2002, after necessary signal processing, forwards the signals from the RAUs 2001 with which it communicates, to the BSC 2003. The BSC 2003, after identifying the intended recipients of the signals, forwards them to the appropriate TSPU 2006 or to the switch/router for further forwarding and switching.

In accordance with the preferred embodiment, the RAU 2001 (FIG. 3) includes the following elements: an Antenna (3001) for receiving wireless signals from users, a Receiver (3002) that receives the user's analog signals, an Analog to Digital Convertor (3003) that digitizes the analog signals, a Compression device (3004) that comprises a microprocessor running compression algorithms, and a Means such as an Ethernet card to convey the signal from RAU to RSPU (3005) either over fiber optic cables, wires, or wirelessly. Digitizing the signal at the RAU reduces the electronic equipment and capital expense of the unit. Compressing the signal reduces the bandwidth and hence operating cost required of transmitting the signal to the RSPU. Use of standard protocols and equipment such as Ethernet cards further reduces the capital expense of the RAU. Separating the RAU from the RSPU allows multiple RAUs to communicate with one RSPU and this serves to reduce the number of devices required to process the signal and hence reduces network costs.

The Received Signal Processing Unit (RSPU) 2002 (FIG. 4) has alternate embodiments of which three are displayed as FIGS. 4A, 4B, and 4C, respectively. The RSPU depicted in FIG. 4A includes a plurality of receivers 4002A such as Ethernet cards to receive the signal transmitted by RAUs. There is one device 4002A per RAU that communicates with the RSPU. A single de-compressor 4002B is provided that preferably comprises a software programmable processor(s) running algorithms to decompress digital signals received from the RAUs. A Signal Processor Sharing Device 4002C is provided, such as a commercially available low cost switching or routing device that allocates the processing responsibility to a single or a plurality of available Signal Processors 4002D. Device 4002D may be a conventional base station or a data server that conducts processing sub-tasks that include Channelization, Timing and Frequency Acquisition, Demodulation, Equalization, Bit Decoding, Data Link Processing, etc. A device 4002E such as an Ethernet card is provided to convey the processed signal to the BSC, using fiber optic cables, wires, or wirelessly.

As indicated above, the RSPU communicates with a plurality of RAUs. As depicted in FIG. 4A, each RSPU includes a corresponding plurality of dedicated devices such as Ethernet cards to receive signals from these RAUs. In other words, there is one receiving device 4002A for each RAU that the RSPU communicates with.

As signals are received by each of the devices 4002A in the RSPU, the signals are sent to a signal processor sharing device 4002C in FIG. 4A that allocates signal processing functions to a de-compressor 4002B. Such sharing of the de-compressor between a multiplicity of RAUs serves the purpose of reducing the number of de-compressors required in a network and thus of reducing the cost of deploying a network. The de-compressor 4002B forwards the de-compressed signal to the Signal Processor 4002 D that conducts processing sub-tasks that include Channelization, Timing and Frequency Acquisition, Demodulation, Equalization, Bit Decoding, Data Link Processing, etc. After completing these processing functions, the signal processor forwards the signals to a transportation device 4002E such as an Ethernet card for further forwarding the signals to the BSC using fiber optic cables, wires, or wirelessly.

FIG. 4B depicts an alternative embodiment than FIG. 4A. The signals received from a plurality of RAUs are allocated to a dedicated set of a plurality of de-compressors 4002B that decompress the signals before forwarding them to the Signal Processor Sharing Device 4002C. In other words, in this embodiment, one de-compressor 4002B is provided for each of the receiving devices 4002A in that RSPU. Using dedicated de-compressors serves to speed up the decompression function while increasing the cost of the RSPU. These de-compressors forward the de-compressed signals to the signal processor sharing device 4002C. Device 4002C forwards the signal for processing to a signal processing device 4002D.

As mentioned above, device 4002D may be a conventional base station, server, FPGA, Programmable DSPs, General Purpose Processors, or other software programmable devices. While device 4002C is shown to forward the signals to one signal processor 4002D, if capacity requirements demand, a plurality of signal processing devices may also be used (this embodiment is not depicted, but it is easy to envision). The number of devices 4002D used need not correspond to the number of RAUs, or number of devices 4002B. The number of devices 4002D used in each RSPU may vary with the wireless protocol (CDMA, WiMax, etc) being processed by the network, cost constraints, call blocking characteristics desired, etc.

FIG. 4C depicts another embodiment of the invention for the RSPU which differs from the RSPU shown in FIGS. 4A and 4B. The signals received from a plurality of RAUs are allocated to a dedicated set of a plurality of de-compressors 4002B that decompress the signals before forwarding them to a similarly dedicated plurality of Signal Processors 4002D1 that conduct part of the signal processing functions such as channelization, timing and frequency acquisition, demodulation, equalization, etc., before forwarding the signals to the Signal Processor Sharing Device 4002C. Device 4002C forwards the signals to the signal processor 4002D2 that then completes the signal processing functions that may include bit decoding, data link processing, etc. The number of signal processors 4002D2 used need not correspond to the number of RAUs, or number of signal processors 4002D1 used. It should be apparent to one of skill in the art that this embodiment serves to increase the RSPU's signal processing capacity of the invention, though at increased cost. The signal processing step typically entails separating individual user voice or data from a frame containing data from a plurality of users. It should apparent that embodiments in addition to those depicted in FIGS. 4A, 4B and 4C are within the general scope of this invention. These embodiments will, in order to optimize between processing power of various processing elements, cost of these processing elements, etc., dedicate some signal processing functions to selected devices and conduct additional functions on shared devices. The optimal mix of processing tasks conducted before and after the sharing device 4002C will vary significantly with the wireless protocol in use, with the choice made between alternate processing elements such as FPGAs, DSPs, or General Purpose Processors, and with other technical and cost considerations.

The Base Station Controller (BSC) 1003 of FIG. 2 performs several functions that include switching or routing individual users' signals to a TSPU or to an MSC 1004 for further signal processing, switching or routing as appropriate.

The Mobile Switch/Router (MSC) 1004 of FIG. 2 typically switches or routes individual user's signals into the PSTN, Internet 1005 or another BSC. The MSC also may perform other functions such as maintaining a register of users it recognizes and who can use the network, billing, and other administrative functions. Many commercial MSCs are available from several vendors such as Alcatel, Lucent, Nortel, etc.

The Transmitted Signal Processing Unit (TSPU) 2006 (FIG. 5) includes a device 5002A such as an Ethernet card to receive digital signals from the BSC, a Signal Processor Sharing Device 5002B such as a commercially available switch that allocates the signal processing duties to an available device, a signal processing device 5002C such as a server that combines individual user signals into a multi-user frame, a compression device 5002D that comprises a processor running algorithms to compress the digital signal, and a device 5002E such as an Ethernet card to Transport the signal to the TAU using fiber optic cables, wires, or wirelessly.

Three embodiments of the TSPU are depicted in FIG. 5 as FIGS. 5A, 5B and 5C. FIG. 5A depicts one embodiment that provides one device 5002A such as an Ethernet card to receive signals from the BSC using fiber optic cables, wires, or wirelessly, one signal processor sharing device 5002B, one signal processor 5002C, one compressor 5002D, and a plurality of 5002E devices that is required to correspond to the number of TAU's communicating with the TSPU.

The signals received from the BSC will typically comprise a frame or a super-frame that includes voice or data circuits or packets destined to one of several users. The signal processing sharing device 5002B relays the frame to the signal processor 5002C. Device 5002C extracts signals destined to different users, rearranges them into frames of the appropriate wireless protocol (Wi-Max, GSM, CDMA, etc.) and forwards the signals to the compressor 5002 D. The compressor compresses the signals using software algorithms running on processors, and conveys the compressed signal to the appropriate Means of Transport 5002E such as an Ethernet card, capable of conveying the signal to the intended TSPU.

FIG. 5B depicts an alternative embodiment to the embodiment depicted in FIG. 5A. Instead of providing for one Signal processor, this embodiment provides for a plurality of Signal Processors 5002C, without changing other components depicted in FIG. 5A. Increasing the number of signal processors serves to increase the processing capacity, though at the same time increases the cost of the TSPU.

FIG. 5C depicts another alternative embodiment to the embodiment depicted in FIGS. 5A and 5B. In order to increase processing capacity even further, FIG. 5C depicts a plurality of processors 5002C accompanied by a corresponding number of dedicated Compressors 5002D. In other words, there is one compressor for each signal processor in the TSPU. Of course, such an increase in compressors will also increase the cost the TSPU.

Other suitable alternate embodiments for the TSPU that share some signal processing functions of signals destined to multiple TAUs on one set of processors will be readily apparent as within the scope of the present invention. Optimizing between the cost and processing capacity of the TSPU will necessarily entail sharing some processing functions and dedicating other to single processors.

The Transmitting Antenna Unit (TAU) 2007 (FIG. 6) includes a receiver 6001 such as an Ethernet card to receive the signal from the TSPU, a de-compression device 6002 that comprises a processor running algorithms to decompress the digital signal received from the TSPU, a Digital to Analog Convertor 6003 that converts the digital signal received from the TSPU into an analog signal as pertinent to the technology (CDMA, GSM, WiMAx, etc.) being used by the network and the intended user, and an Amplifier Transmitter 6004 to transmit the signal via the antenna 6005.

Thus, the present invention provides both a method and system for reducing the bandwidth requirements for the link between receiving antenna units (RAUs) and shared, software configurable, received signal processor units (RSPUs) as well as the link between transmitting antenna units (TAUs) and transmitted signal processor units (TSPUs). More particularly, an embodiment of the RAU includes an antenna for receiving analog RF signals from a plurality of remote users in the form of frames of the appropriate wireless protocols WiMax, GSM, TDMA, UMTS, and CDMA, etc. including hitherto undefined protocols and an appropriately selected analog to digital converter for converting these analog signals into digital signals.

The RAU preferably also includes a means for compressing the digital signals using known compression techniques or using yet to be invented compression techniques. A transporter or transmitter is also provided to transport or transmit the compressed digital signals using transmission protocols such as Ethernet, SS7, Abis, Internet Protocol, etc, or hitherto undefined protocols over transmission media such as fiber, copper, microwave, optical or other media to a shared RSPU. Use of compression at the RAU serves the purpose of reducing bandwidth requirements on the link between the RAU and the RSPU, and hence of reducing the cost of acquiring this link. Facilitating the use of a multiplicity of transmission protocols allows users to choose the protocol and transmission media most suited to their operating environments.

The RSPU includes a receiver capable of receiving the compressed digital signals from the RAU transmitter. The RSPU further includes a decompressor capable of decompressing signals transmitted from the RAU. The RSPU also includes a means to assign the component to one of several shared, software configurable, signal processing devices. A processor is provided to process these signals to extract individual users' signal components. The RSPU may further include a means for transmitting the individual users' signal components onwards via the internet, switched telephone, and/or other networks using transmission protocols such as Ethernet, SS7, Abis, Internet Protocol, etc, or hitherto undefined protocols over transmission media such as fiber, copper, microwave, optical or other media.

A preferred embodiment of the invention entails serving multiple RAUs from a smaller number of RSPUs that are not co-located. In the preferred embodiment, the distance between the RAU's and RSPU's may be as great as several kilometers to allow the maximum opportunity of sharing RSPUs. The number of RAUs required in the network depends on the number of users, geography, topography, cost and other criteria. Similarly, the TAUs and TSPUs may also be located at great distances from each other. In the preferred embodiment, the RSPUs and TSPUs are located in the same room though other embodiments in which the RSPUs and TSPUs are located in different geographic locations are within the scope of the invention. In one preferred embodiment, depending on criteria such as cost, a plurality of RSPUs and TSPUs they may be located in one computer cabinet. In another preferred embodiment a plurality of RSPUs may be housed in one cabinet distinct from other cabinets housing additional RSPUs and cabinets housing a plurality of TSPUs.

In a preferred embodiment, one RAU and one TAU, each serving the same plurality of users, is housed in the same cabinet to reduce cost. In another preferred embodiment, one RAU and one TAU serving the same plurality of users may be housed in different cabinets, but in the same room, to increase capacity though at an increased cost. In other embodiments, it is desirable for technical or geographical constraints to house one RAU serving a plurality of users at a geographical distance from the TAU serving the same plurality of customers. In still another embodiment, plurality of users served by one RAU may be served by one TAU while another set of a plurality of users served by the same RAU are served by a different TAU. In other words, in this embodiment, a one to one ordering of RAU and TAU is avoided to increase network flexibility. In still another embodiment, plurality of users served by one TAU may be served by one RAU while another set of a plurality of users served by the same RAU are served by a different TAU. In other words, in this embodiment, a one to one ordering of RAU and TAU is avoided to increase network flexibility.

An embodiment of the TSPU can include a means for receiving signals from the internet, switched telephone and/or other networks using transmission protocols such as Ethernet, SS7, Abis, Internet Protocol, etc, or hitherto undefined protocols over transmission media such as fiber, copper, microwave, optical or other media, and a means for assigning the signal to one of several shared, software configurable, signal processing devices such as servers. The TAU may also include a means for processing these signals and a means for packaging the processed signals via software algorithms running on processors destined for a plurality of users into frames of the appropriate wireless protocol such as WiMax, GSM, TDMA, UMTS, CDMA, etc. The TSPU may further include a means for compressing these digital signals using known compression techniques or using yet to be invented compression techniques and a means for transporting the compressed digital signals to the appropriate TSPU using transmission protocols such as Ethernet, SS7, Abis, Internet Protocol, etc, or hitherto undefined protocols over transmission media such as fiber, copper, microwave, optical or other media.

An embodiment of the TAU may include a means for receiving compressed digital signals from the TSPU and a means for decompressing these signals using known de-compression techniques corresponding to compression techniques used at the TSPU. The TAU may also include an appropriately selected digital to analog converter for converting these digital signals into analog signals of appropriate wireless protocol WiMax, GSM, TDMA, UMTS, and CDMA, and other undescribed protocols and an amplifier-transmitter for transmitting analog RF signals over the antenna to remote users.

A preferred embodiment of the invention entails serving multiple TAUs from a smaller number of TSPUs that are not co-located. In the preferred embodiment, the distance between the TAU's and TSPU's may be several kilometers to allow the maximum opportunity of sharing TSPUs. In another embodiment, it is envisaged that the TAU and TSPU can be co-located in the same cabinet where necessary, though with some loss of economies.

FIG. 1 illustrates a system 100 in accordance with an embodiment of the invention. It should be readily apparent to those of ordinary skill in the art that the system 100 depicted in FIG. 1 represents a schematic illustration and that other components may be added or existing components may be removed or modified.

Embodiments of this invention offer benefits including the following. First, a network using this system is significantly more flexible than networks described in the prior art and in use today as the TAU and RAU are wireless protocol agnostic and can be used interchangeably to communicate signals for several protocols including WiMax, GSM, TDMA, UMTS, and CDMA, etc, and hitherto undefined protocols to and from the TSPU and the RSPU as appropriate. Further, the software programmable RSPUs and TSPUs are designed to allow processing of signals for different protocols with only a software change and no corresponding hardware change. Second, by using software programmable, general purpose processors, programmable DSPs, and/or FPGAs operating as a part of or in conjunction with servers as signal processors in the TSPUs and RSPUs network upgrades can be made via software changes rather than through expensive hardware changes. Third, since TSPUs are shared by several TAUs and RSPUs are shared by RAUs, a costly one for one physical correspondence if receiving capacity and signal processing capacity is not necessary. This shared system would likely require significantly reduce processing capacity than that required in a thick client system for equivalent network call blocking probability.

This invention allows sectored implementation of cellular networks by facilitating each cell site to be split into multiple sectors. Further, Forward Error Correction can be added in the RAU, RSPU, BSC, TSPU, and TAU to reduce the impact of noise related errors in the received signals. Further still, encryption can be added at any or all of the BSC, TSPU, TAU, RSPU, and RAU to facilitate secure transmission of signals. Further still, the Base Station Controller can be combined with the TSPU and/or the RSPU into one device or into blade cards loaded into a common housing such as air cooled or air conditioned electrical cabinets manufactured by APC or Hewlett Packard.

The invention is preferably performed as computer programs implemented by one or more processors. The computer programs may exist in a variety of forms both active and inactive. For example, the computer programs can exist as software program(s) comprised of program instructions in source code, object code, executable code or other formats; firmware program(s); or hardware description language (HDL) files. One or more processors can be provided to perform the operations of each of the RAU, RSPU, TAU, TSPU. Alternatively, a single processor can perform the operations of all of the RAU, RSPU, TAU, TSPU, as well as other elements of the network such as the BSC. Any of the above can be embodied on a computer readable medium, which include storage devices and signals, in compressed or uncompressed form.

Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet or other download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A system for conveying signals to and/or from a plurality of user communication devices over a Base Station Controller, the system comprising:
  a plurality of receiver antenna units for receiving signals;
  a received signal processing unit in communication with said plurality of receiver antenna units, said received signal processing unit including:
    a plurality of shared signal processing devices for processing the received signals from said plurality of receiver antenna units;
    a controller for assigning the received signals from said plurality of receiver antenna units to at least one of said plurality of shared signal processing devices to optimize the use of said plurality of shared signal processing devices;
    wherein said shared signal processing devices generate an uplink signal, and said received signal processing unit transmits the uplink signal to the Base Station Controller;
  a transmitted signal processing unit receiving a downlink signal from the Base Station Controller, said transmitted signal processing unit including:
    a plurality of shared signal processing devices for processing the signal received from the Base Station Controller;
    a controller for assigning the downlink signal to at least one of said plurality of shared signal processing devices to optimize the use of said plurality of shared signal processing devices;
    wherein said plurality of shared signal processing devices generate a processed downlink signal and transmit the downlink signal to the transmitter antenna unit: and
  a plurality of transmitter antenna units in communication with said transmitted signal processing unit, said plurality of transmitter antenna units receiving the processed downlink signal and transmitting the processed downlink signal to the user communication devices.

2. The system of claim 1, wherein each of said receiver antenna units further comprise:
  a means for receiving RF signals transmitted by the user communication devices;
  an analog to digital conversion means for converting the received RF signals into digital signals;
  a means for compressing the digital signals, wherein the digital signals are both previously compressed and previously uncompressed; and
  a means for transmitting the compressed digital signals to a shared remotely located signal processing system.

3. The system of claim 1, wherein said received signal processing unit further comprises:
  a means for receiving compressed digital signals from said receiver antenna units; and
  a means for decompressing the compressed digital signals.

4. The system of claim 1, wherein said transmitted signal processing unit further comprises:
  a means for receiving signals from the Base Station Controller; and
  a means for compressing the signals, wherein the signals are both previously compressed and previously uncompressed.

5. The system of claim 1, wherein said transmitter antenna units each comprise:
a means for receiving compressed digital signals from the transmitted signal processing unit;
a means for decompressing these signals;
a digital to analog conversion means for converting these digital signals into analog signals; and
a means for transmitting analog RF signals to remote user communication devices.

6. The system of claim 1, wherein said receiver antenna units each further comprise:
an antenna for receiving RF signals transmitted by the user communication devices;
an analog to digital converter for converting the received RF signals into digital signals;
a compressor for compressing the digital signals, wherein the digital signals are both previously compressed and previously uncompressed; and
a transmitter for transmitting the compressed digital signals to a shared remotely located signal processing system.

7. The system of claim 1, wherein said received signal processing unit comprises:
a receiver for receiving the compressed digital signals from said receiver antenna units;
a decompressor for decompressing the received signals.

8. The system of claim 1, wherein said transmitted signal processing unit further comprises:
a receiver for receiving signals from the Base Station Controller; and
a compressor for compressing the signals, wherein the signals are both previously compressed and previously uncompressed.

9. The system of claim 1, wherein each of said transmitter antenna units comprise:
a receiver for receiving compressed digital signals from the transmitted signal processing unit;
a decompressor for decompressing these signals;
a digital to analog converter for converting these digital signals into analog signals; and
an amplifier-transmitter for transmitting analog RF signals over the antenna to remote user communication devices.

10. A system for conveying signals to and/or from a plurality of active or passive signal emitters over a Base Station Controller, the system comprising:
a plurality of sensor units for receiving signals;
a received signal processing unit in communication with said plurality of sensor units, said received signal processing unit including:
a plurality of shared signal processing devices for processing the received signals from said plurality of sensor units;
a controller for assigning the received signals from said plurality of sensor units to at least one of said plurality of shared signal processing devices to optimize the use of said plurality of shared signal processing devices;
wherein said shared signal processing devices generate an uplink signal, and said received signal processing unit transmits the uplink signal to the Base Station Controller;
a transmitted signal processing unit receiving a downlink signal from the Base Station Controller, said transmitted signal processing unit including:
a plurality of shared signal processing devices for processing the signal received from the Base Station Controller;
a controller for assigning the downlink signal to at least one of said plurality of shared signal processing devices to optimize the use of said plurality of shared signal processing devices;
wherein said plurality of shared signal processing devices generate a processed downlink signal and transmit the downlink signal to a transmitter antenna unit; and
a plurality of transmitter antenna units in communication with said transmitter signal processing unit, said plurality of transmitter antenna units receiving the processed downlink signal and transmitting the processed downlink signal to the said signal emitters.

11. The system of claim 10, wherein each of said plurality of sensor units further comprise:
a means for sensing signals emitted by said signal emitters;
an analog to digital conversion means for converting the sensed signals into digital signals;
a means for compressing the digital signals; and
a means for transmitting compressed digital signals to a shared signal processing system.

12. The system of claim 10, wherein said received signal processing unit further comprises:
a means for receiving compressed digital signals from said receiver antenna units; and
a means for decompressing the compressed digital signals.

13. The system of claim 10, wherein said transmitter antenna unit further comprises:
a means for receiving signals from the Base Station Controller; and
a means for compressing the signals.

14. The system of claim 10, wherein said plurality of transmitter antenna units each comprise:
a means for receiving compressed digital signals from the transmitted signal processing unit;
a means for decompressing these signals;
a digital to analog conversion means for converting these signals into analog signals; and
a means for transmitting signals to said signal emitters.

15. The system of claim 10, wherein said plurality of sensor units each further comprise:
a sensor for receiving signals from said signal emitters;
an analog to digital converter for converting the sensed signals into digital signals;
a compressor for compressing the digital signals; and
a transmitter for transmitting the compressed digital signals to a shared signal processing system.

16. The system of claim 10, wherein said received signal processing unit comprises:
a receiver for receiving the compressed digital signals from said sensor units; and
a decompressor for decompressing the received signals.

17. The system of claim 10, wherein said transmitted signal processing unit further comprises:
a receiver for receiving signals from the Base Station Controller; and
a compressor for compressing the signals.

18. The system of claim 10, wherein each of said plurality of transmitter antenna units comprise:
a receiver for receiving compressed signals from the transmitted signal processing unit;
a decompressor for decompressing these signals;
a digital to analog converter for converting these digital signals into analog signals; and
an amplifier-transmitter for transmitting signals to said signal emitters.

* * * * *